United States Patent
Kim

(10) Patent No.: US 6,999,203 B1
(45) Date of Patent: Feb. 14, 2006

(54) CIRCUIT AND METHOD FOR MULTI-BIT PROCESSING OF GRAY SCALE IMAGE IN LASER BEAM PRINTER

(75) Inventor: Cheol Kim, Suwon-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 963 days.

(21) Appl. No.: 09/679,517

(22) Filed: Oct. 6, 2000

(30) Foreign Application Priority Data

Oct. 6, 1999 (KR) .............................. 1999-43124

(51) Int. Cl.
*H04N 1/40* (2006.01)
(52) U.S. Cl. ..................................... 358/3.12; 358/3.06
(58) Field of Classification Search ...... 358/3.06–3.14, 358/524–539
See application file for complete search history.

(56) References Cited

U.S. PATENT DOCUMENTS

| | | | |
|---|---|---|---|
| 4,673,951 A | * | 6/1987 | Mutoh et al. .................. 347/15 |
| 5,625,755 A | * | 4/1997 | Shu ............................. 358/1.9 |
| 5,684,932 A | * | 11/1997 | Shu ............................. 358/1.9 |

FOREIGN PATENT DOCUMENTS

| JP | 63-286351 | 11/1988 |
|---|---|---|
| JP | 5-95474 | 4/1993 |
| JP | 5-183752 | 7/1993 |
| JP | 10-145615 | 5/1998 |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

A circuit and method for multi-bit processing of a gray scale image in a printer. In the multi-bit processing circuit, a divider divides the gray component value of each pixel in a multi-bit image by the resolution of the printer and outputs the quotient. A remainder calculator outputs the remainder of the division for the input of the gray component value. A half-tone table stores half tone values corresponding to thresholds for pixels. A comparator compares the remainder with a corresponding threshold half tone value received from the half-tone table and outputs a binary bit according to the comparison result. A position controller controls the half-tone table to repeatedly output the threshold half tone value of each pixel. An adder adds the quotient received from the divider to the gray component of the binary processed output of the comparator, pixel by pixel and outputting a multi-bit dithered image. A pulse width modulator modulates the multi-bit dithered image received from the adder to different pulse widths according to the gray components of the pixels of the multi-bit dithered image and controls the modulated image to be printed in dots of different sizes.

7 Claims, 4 Drawing Sheets

(a) GRAY INPUT   (b) THRESHOLDS   (c) ONE BIT OUTPUT

FIG. 5

CIRCUIT AND METHOD FOR MULTI-BIT PROCESSING OF GRAY SCALE IMAGE IN LASER BEAM PRINTER

PRIORITY

This application claims priority to an application entitled "Circuit and Method for Multi-Bit Processing of Gray Scale Image in Laser Beam Printer" filed in the Korean Industrial Property Office on Oct. 6, 1999 and assigned Serial No. 99-43124, the contents of which are hereby incorporated by reference.

BACKGROUND OF THE INVENTION

1. Field of the Invention

The present invention relates generally to a laser beam printer (LBP), and in particular, to a circuit and method for displaying a gray scale image in a black-and-white output device through multi-bit processing instead of conventional binary processing in a LBP in order to increase printing quality.

2. Description of the Related Art

In general, a multi-bit image, i.e., a gray scale image is converted to a binary bit map through binary image conversion prior to printing in an LBP.

FIG. 1 is a block diagram of a binary processing circuit in a conventional LBP. Referring to FIG. 1, the binary processing circuit is comprised of a half-tone table 102 for storing half tone values to be used for converting multi-bit gray scale image data to binary image data, a position controller 104 for controlling the half-tone table 102 to repeatedly read a half tone value corresponding to a threshold for a current pixel according to image size and the position of the pixel, and a comparator 100 for comparing the gray component of each pixel in an input image with the threshold for the pixel received from the half-tone table 102 and converting the gray component to binary data.

In operation, at the same time when image conversion starts, the position controller 104 generates a control signal including information about horizontal and vertical positions to allow a half tone value at a specific location to be read. Upon receipt of the control signal, the half-tone table 102 outputs a half tone value corresponding to a threshold for a pixel at the horizontal and vertical positions to the comparator 100. The comparator 100 compares the gray component value of the pixel in an input image with the half tone value received from the half-tone table 102. If the gray component value is greater than or equal to the half tone value, the comparator 100 outputs a logic high signal "1", and if the gray component value is smaller than the half tone value, it outputs a logic low signal "0". Then, the binary encoded output of the comparator 100 is printed on a sheet of paper by laser beams.

FIG. 2 (*a*) shows gray component values of the pixels in the input image, FIG. 2 (*b*) shows half tone values corresponding to thresholds for the pixels applied by the half-tone table 102, and FIG. 2 (*c*) shows binary encoded output of the comparator 100 after comparison between the pixels shown in FIG. 2 (*a*) and the thresholds shown in FIG. 2 (*b*).

As noted from FIG. 2 (*c*), the conventional binary processing method, which simply converts an input multi-bit image to a binary image, may decrease printing quality.

To solve this problem, a method has been explored in which the gray level of each image pixel is expressed by forming a half-tone cell with a plurality of dots in the form of a lattice and varying the number of dots to be on/off among the half-tone cell dots in order to convert a multi-bit image to a binary image while image quality is maintained at a desired level.

The above method, however, requires a large half-tone cell to express many gray levels and produces a very coarse printed image because dots within the half-tone cell are visible to the naked eye. Another problem is that a small half-tone cell also decreases the printing quality of an image because it increases the resolution of the image but allows a decreased number of gray levels to be expressed.

SUMMARY OF THE INVENTION

It is, therefore, an object of the present invention to provide a circuit and method for expressing a greater number of gray levels with a half-tone cell of a decreased size in printing an image by laser beams.

To achieve the above object, a circuit for multi-bit processing of a gray scale image in a printer includes a divider, a remainder calculator, a half-tone table, a comparator, a position controller, an adder, and a pulse width modulator. The divider divides the gray component value of each pixel in a multi-bit image by the resolution of the printer and outputs the quotient. A remainder calculator outputs the remainder of the division for the input of the gray component value. A half-tone table stores half tone values corresponding to thresholds for pixels. A comparator compares the remainder with a corresponding threshold half tone value received from the half-tone table and outputs a binary bit according to the comparison result. A position controller controls the half-tone table to repeatedly output the threshold half tone value of each pixel. An adder adds the quotient received from the divider to the gray component of the binary processed output of the comparator, pixel by pixel, and outputs a multi-bit dithered image. A pulse width modulator modulates the multi-bit dithered image received from the adder to different pulse widths according to the gray components of the pixels of the multi-bit dithered image and controls the modulated image to be printed in dots of different sizes.

BRIEF DESCRIPTION OF THE DRAWINGS

The above and other objects, features and advantages of the present invention will become more apparent from the following detailed description when taken in conjunction with the accompanying drawings in which:

FIG. 5 shows printed images according to multi-bit dithering of the present invention and conventional one-bit dithering with respect to gray levels.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
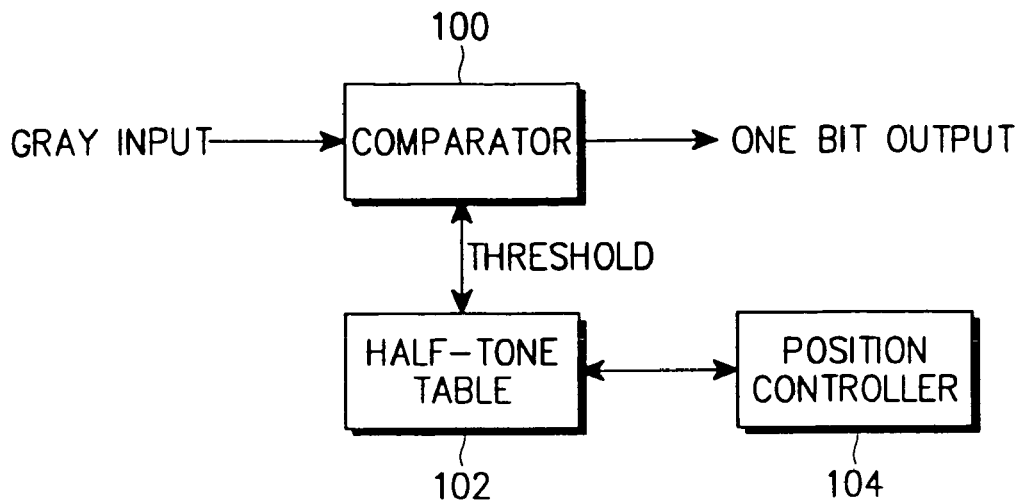
FIG. 1 is a block diagram of a binary processing circuit in a conventional LBP.
Figure 2:
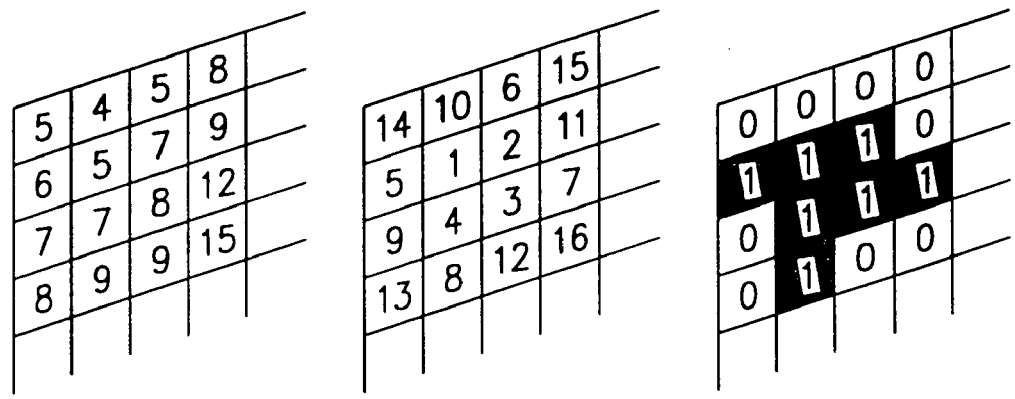
FIGS. 2 (*a*)–(*c*) illustrate an example of binary processing in the conventional binary processing circuit.
Figure 3:
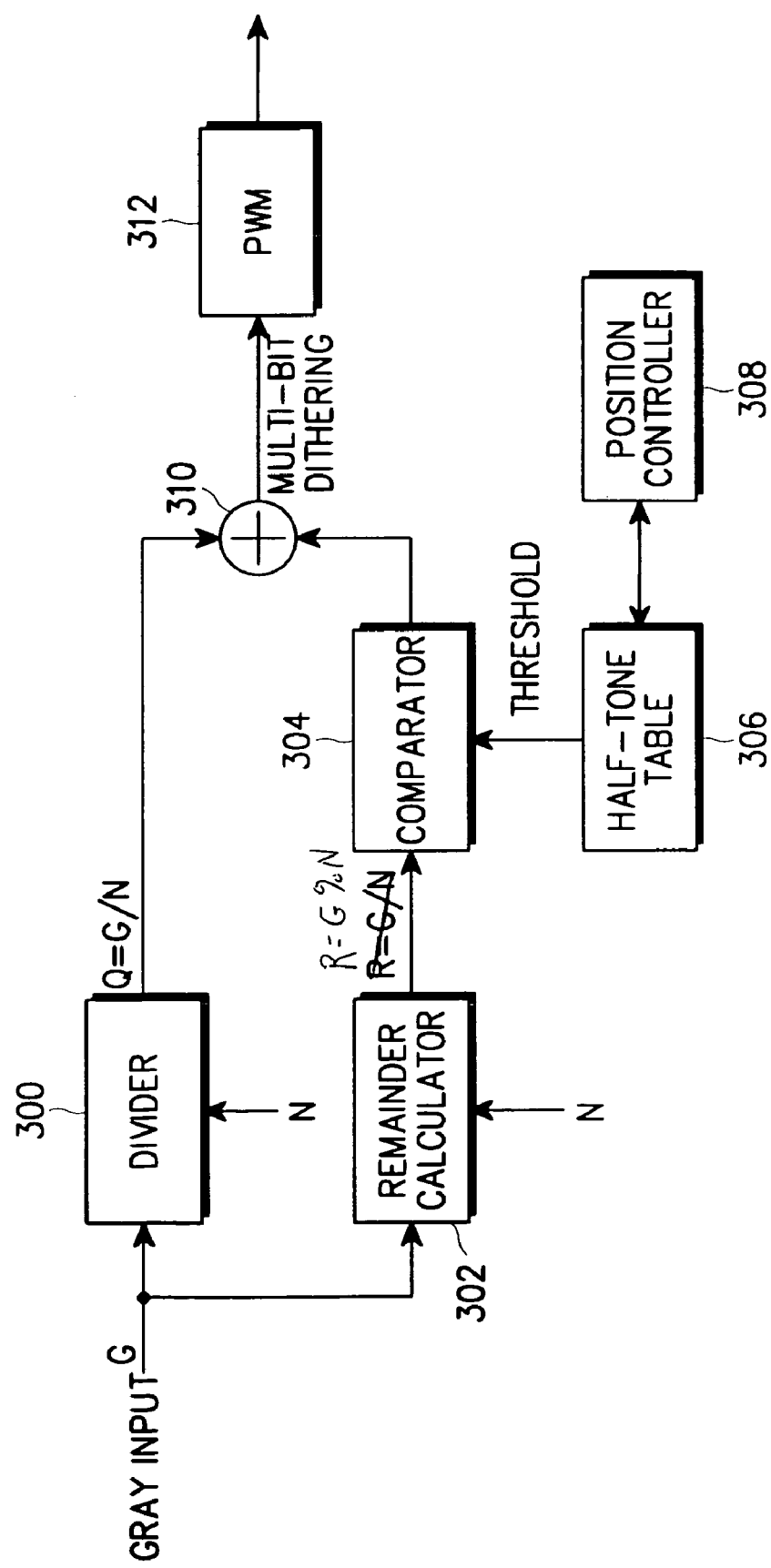
FIG. 3 is a block diagram of a multi-bit processing circuit in a LBP according to an embodiment of the present invention.

FIG. 3 is a block diagram of a circuit for multi-bit processing of a gray scale image in an LBP according to an embodiment of the present invention. Referring to FIG. 3, the image multi-bit processing circuit is comprised of a divider 300 for dividing the gray component value G of each pixel in an input multi-bit image by the resolution N of the printer and outputting the quotient (G/N), i.e., a majority value, a remainder calculator 302 for outputting the remainder R of the division for the input of the gray component value G, a half-tone table 306 for storing half tone values corresponding to thresholds, a comparator 304 for comparing the remainder R with a threshold half tone value for the pixel in question, outputting a logic high signal "1" if the remainder R is greater than or equal to the threshold, and outputting a logic low signal "0" if the remainder R is smaller than the threshold, a controller 308 for controlling the half-tone table 306 to repeatedly output a threshold half tone value for each pixel, an adder 310 for adding the quotient Q and the gray component value of the binary encoded output of the comparator 304, pixel by pixel, and a pulse width modulator (PWM) 312 for modulating a multi-bit dithered image received from the adder 310 to different pulse widths according to the gray component values of its pixels and controlling the modulated pixels to be printed in dots of different sizes.

A detailed description will be made of the operation of the gray scale image multi-bit processing circuit for the LBP according to the embodiment of the present invention with reference to FIG. 3. The following description is also conducted with the appreciation that the gray component value G of each pixel in an input multi-bit image is expressed in four bits (thus, the number of expressible gray levels is 16) and the resolution N of an output device is 4 (i.e., one pixel can be divided into four segments and expressed at a gray level of 0, 1, 2, 3, or 4).

Upon receipt of the gray component value G, the divider 300 generates the quotient Q resulting from dividing the gray component G by a divisor D and the remainder calculator 302 generates the remainder R resulting from the division. Here, $$D = M/N = 16/4 = 4 \quad (1)$$

where M (=16) is the number of gray levels at which each pixel of the input image can be expressed.

The embodiment of the present invention is described for clarity in the context of the case that an input image having each pixel expressed at 16 levels is displayed as one having each pixel expressed at 4 levels in the output device.

The quotient Q is the majority value of the gray component value G and determined to range from 0 to (N−1) by the divisor D. The quotient Q indicates which group the gray component G of each pixel expressed at M levels belongs to when it is grouped into the resolution N of the output device.

Figure 4:
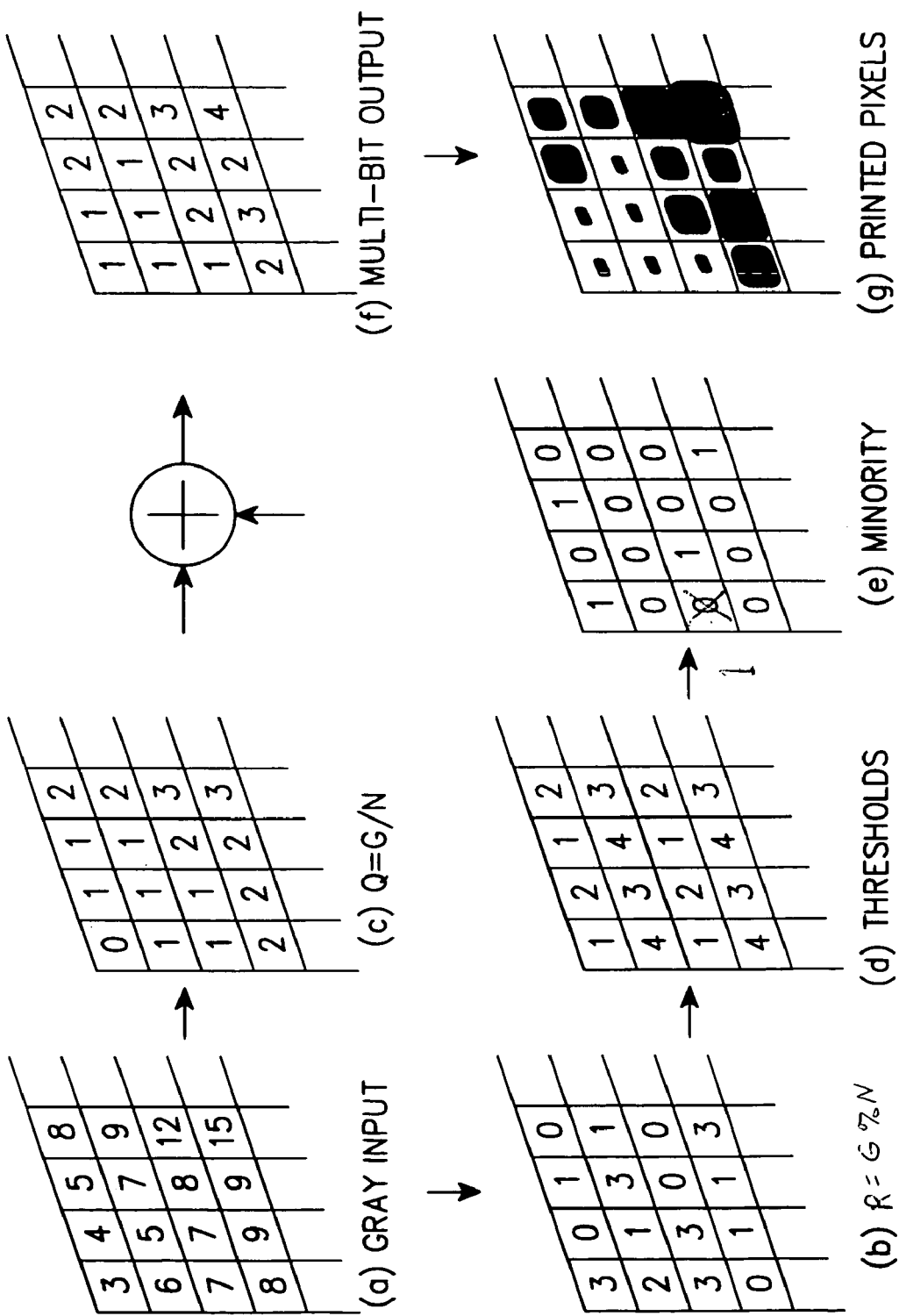
FIG. 4 illustrates an example of multi-bit processing according to the embodiment of the present invention.

The gray component value G of each pixel shown in FIG. 4 (a) is converted to its quotient Q for the divisor D as shown in FIG. 4 (c), i.e., a gray component which belongs to one of the N groups.

The comparator 304 compares the remainder R with a threshold received from the half-tone table 306. In the same manner as the conventional method, the comparator 304 outputs "1" if the remainder R is greater than or equal to the threshold and "0" if the remainder R is smaller than the threshold. The output of the comparator 304 is reflected as a minority value of the gray component value G in relation with the majority value Q of the gray component value G.

For the input of the gray component value G shown in FIG. 4 (a), the remainder calculator 302 outputs the remainder R obtained from the division using the divisor D shown in FIG. 4 (b). The comparator 304 compares the remainder R with a half tone value corresponding to a threshold for the pixel in question received from the half-tone table 306. If the remainder R is greater than or equal to the threshold, the comparator 304 outputs a binary bit "1" and if the remainder R is smaller than the threshold, it outputs a binary bit "0". As shown in FIG. 4 (e), the output of the comparator 304 is the same as that in the conventional binary processing method.

Then, the adder 310 adds the majority value Q and the minority value of the gray component value G to a multi-bit dithered value. Because the minority value is achieved through binary processing and thus has 0 or 1, the output of the adder 310 is Q or Q+1. The PWM 312 pulse-width-modulates Q or Q+1. The PWM values are printed in different-size dots by laser beams corresponding to the PWM values.

Each multi-bit dithered pixel output from the adder 310 is added to the minority value as shown in FIG. 4 (f) after the addition of the majority value Q as shown in FIG. 4 (c) and the minority value as shown in FIG. 4 (e) and printed in different-size dots as shown in FIG. 4 (g).

Figure 5:
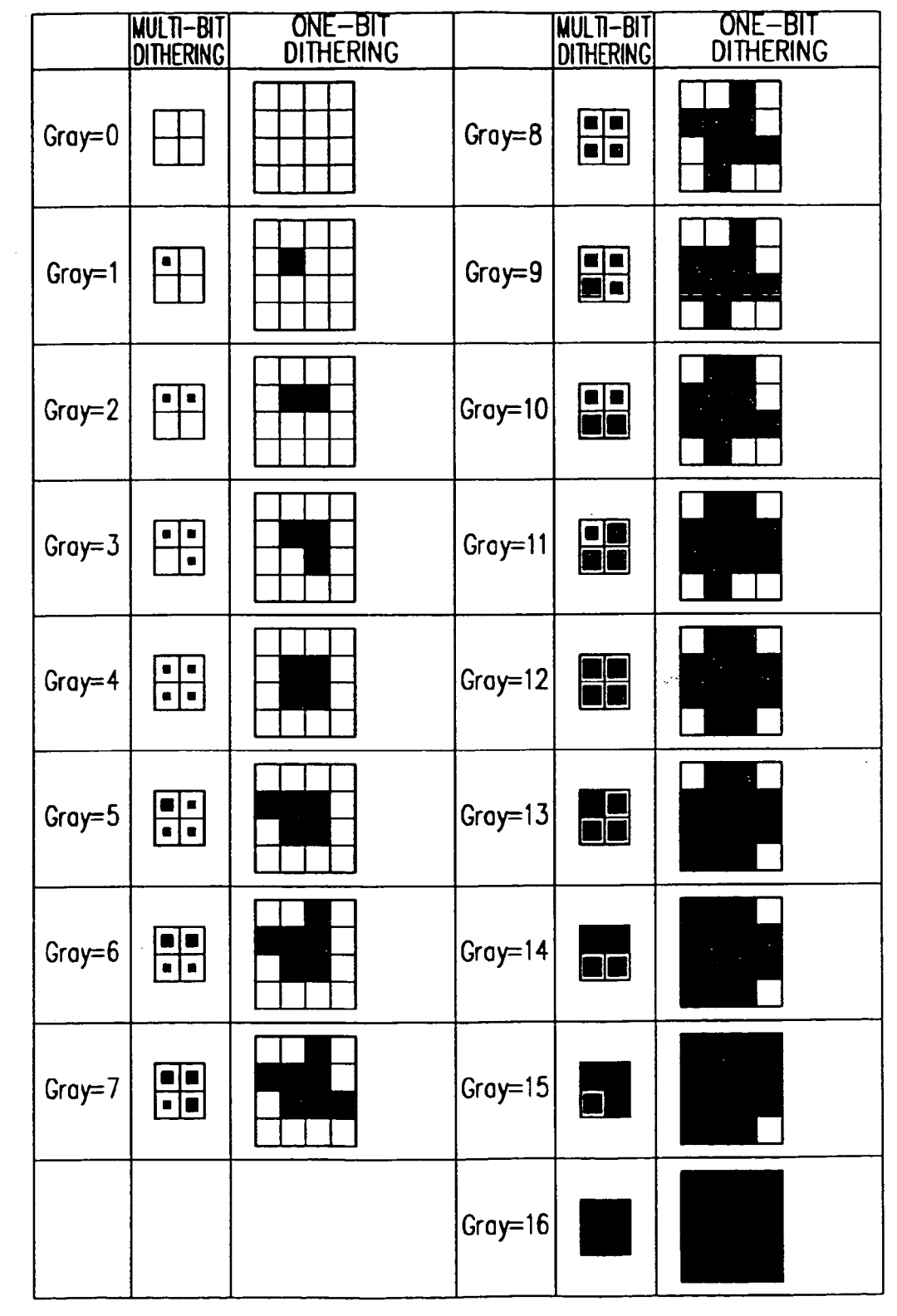

FIG. 5 illustrates printed images with respect to the gray component value G in both cases of multi-bit dithering of the present invention and conventional one-bit dithering. As shown in FIG. 5, although the size of a half tone cell to express the same gray level in the multi-bit dithering case is no more than a quarter of that in the one-bit dithering case, dots marked black are uniformly distributed. The decrease in the half-tone cell size to express the same gray level increases the resolution and printing quality of an image. Further, the uniform dot distribution in a half-tone cell renders the dots invisible to the naked eye and thus allows a fine image to be reproduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A circuit for multi-bit processing of a gray scale image in a printer, comprising:
   a divider for converting the gray component value of each pixel in a multi-bit image into a resolution of a printer to output a first value;
   a remainder calculator for converting the gray component value of each pixel in a multi-bit image into the resolution of the printer, to output a second value;
   a half-tone table for storing half tone values corresponding to thresholds for pixels;
   a comparator for comparing the remainder with a corresponding threshold half tone value received from the half-tone table and outputting a binary bit according to the comparison result;
   a position controller for controlling the half-tone table to repeatedly output the threshold half tone value of each pixel;
   an adder for adding the quotient received from the divider to the gray component of the binary processed output of the comparator, pixel by pixel and outputting a multi-bit dithered image; and a pulse width modulator for modulating the multi-bit dithered image received from the adder to different pulse widths according to the gray components of the pixels of the multi-bit dithered image and controlling the modulated image to be printed in dots of different sizes.

2. The circuit according to claim 1, wherein said divider outputs said first value which is a quotient obtained by dividing said gray component value G by a divider coefficient D, said divider coefficient being obtained by dividing a number of multi-bit level M of the gray component value G by the resolution of the printer.

3. The circuit according to claim 1, wherein said remainder calculator outputs said second value which is a remainder obtained by dividing said gray component value G by a divider coefficient D, said divider coefficient being obtained by dividing a number of multi-bit level M of the gray component value G by the resolution of the printer N.

4. A method for multi-bit processing of a gray scale image in a printer, comprising:
- multi-bit dithering each pixel of input image expressed as a gray component, and
- causing said multi-bit dithered image to be printed in a dot of a respectively different size according to a gray component value of each pixel,
- wherein the multi-bit dithering step comprises:
- outputting a second value obtained by converting a gray component value of each pixel in said input image into the resolution of the printer, and comparing the second value with a threshold half tone value corresponding to each pixel of the input image, and outputting a binary processed value according to the compared result,
- adding a first value obtained by converting a gray component value of each pixel in said input image into the resolution of the printer to said binary processed value, and multi-bit dithering the added result.

5. The method according to claim 4, wherein said first value is a quotient obtained by dividing said gray component value G by a divider coefficient D, said divider coefficient being obtained by dividing a number of multi-bit level M of the gray component value G by the resolution of the printer.

6. The method according to claim 4, wherein said second value is a remainder obtained by dividing said gray component value G by a divider coefficient D, said divider coefficient being obtained by dividing a number of multi-bit level M of the gray component value G by the resolution of the printer.

7. A method for multi-bit processing of a gray scale image in a printer, comprising the steps of:
- converting each pixel in an input image expressed as a gray level applied to the printer into the resolution of the printer,
- comparing the remainder among gray component values of each pixel in said input image converted into the resolution of the printer with a threshold half tone value corresponding to each pixel of said input image, and outputting a binary processed value according to the compared result;
- adding the quotient among the gray component values of each pixel in said input image converted into the resolution of the printer to the binary processed value, and multi-bit dithering the added result; and
- modulating the multi-bit dithered image to a respectively different pulse width according to the gray components of the pixels of the multi-bit dithered image and causing the modulated image to be printed in dots of a respectively different size.

* * * * *